United States Patent
Huang (10) Patent No.: US 7,928,904 B2
(45) Date of Patent: Apr. 19, 2011

(54) SIGNAL ACQUIRING METHOD OF GPS RECEIVER AND DIGITAL CAMERA THEREOF

(75) Inventor: Chao-Hui Huang, Hemei Township (TW)

(73) Assignee: Altek Corporation, Hsinchu (TW)

( * ) Notice: Subject to any disclaimer, the term of this patent is extended or adjusted under 35 U.S.C. 154(b) by 419 days.

(21) Appl. No.: 12/142,842

(22) Filed: Jun. 20, 2008

(65) Prior Publication Data
US 2009/0167602 A1    Jul. 2, 2009

(30) Foreign Application Priority Data
Dec. 26, 2007    (TW) ............................... 96150373 A (51) Int. Cl.
*G01S 5/02* (2010.01)
*H04N 101/00* (2006.01)

(52) U.S. Cl. .......... 342/357.52; 342/357.68; 342/357.77

(58) Field of Classification Search ............. 342/357.52, 342/357.63, 357.67–357.69, 357.75, 357.76, 342/357.77; G01S 1/02, 1/04, 5/02, 7/285, G01S 7/295, 7/526, 7/53; G03B 29/00; H04N 101/00
See application file for complete search history.

(56) References Cited

U.S. PATENT DOCUMENTS

| | | | |
|---|---|---|---|
| 5,134,487 A * | 7/1992 | Taguchi et al. ............ | 348/384.1 |
| 5,495,203 A * | 2/1996 | Harp et al. .................... | 329/306 |
| 5,526,126 A * | 6/1996 | Furihata et al. .............. | 386/203 |
| 5,990,827 A * | 11/1999 | Fan et al. ................. | 342/357.37 |
| 6,490,323 B1 * | 12/2002 | Shen et al. ................. | 375/240.2 |
| 6,995,708 B2 * | 2/2006 | Schmidt ................... | 342/357.71 |
| 7,551,126 B2 * | 6/2009 | Loomis et al. ........... | 342/357.46 |
| 7,719,576 B2 * | 5/2010 | Abraham et al. ........... | 348/222.1 |
| 7,724,845 B2 * | 5/2010 | Sorrells et al. ................ | 375/343 |
| 2004/0100567 A1 * | 5/2004 | Miller et al. ................. | 348/239 |
| 2004/0109059 A1 * | 6/2004 | Kawakita ...................... | 348/143 |
| 2004/0176170 A1 * | 9/2004 | Eck et al. ........................ | 463/43 |
| 2004/0202235 A1 * | 10/2004 | Kohli et al. .................... | 375/150 |

* cited by examiner

Primary Examiner — Thomas H Tarcza
Assistant Examiner — John B Vigushin
(74) Attorney, Agent, or Firm — Stevens & Showalter LLP (57) ABSTRACT

A signal acquiring method of a GPS receiver and a digital camera thereof, suitable for accelerating a signal acquiring speed of the GPS receiver, are described. The signal acquiring method includes the following steps receiving a plurality of satellite signals; performing a discrete cosine transform (DCT) demodulation procedure, so as to parse a receiving time base of the satellite signals; next, transforming the satellite signals into a code information and a navigation frequency according to the receiving time base of the satellite signals; then, performing a correlation correction procedure to acquire a navigation information from the satellite signals according to the code information and the navigation frequency; which thus accelerates the processing speed on the signal acquiring flow through calculation characteristics of the DCT.

2 Claims, 8 Drawing Sheets

SIGNAL ACQUIRING METHOD OF GPS RECEIVER AND DIGITAL CAMERA THEREOF

CROSS-REFERENCE TO RELATED APPLICATIONS

This non-provisional application claims priority under 35 U.S.C. §119(a) on Patent Application No(s). 096150373 filed in Taiwan, R.O.C. on Dec. 26, 2007 the entire contents of which are hereby incorporated by reference.

BACKGROUND OF THE INVENTION

1. Field of the Invention

The present invention relates to a signal processing method of a global positioning system (GPS) receiver and a device thereof, and more particularly to a signal acquiring method of the GPS and a digital camera using the same.

2. Related Art

The positioning flow of GPS includes the following steps: data acquiring, signal acquisition, signal tracking, and positioning. Commonly used GPS receiver mainly receives L1 carrier wave and Coarse/Acquisition (C/A) code.

Frequencies of carrier waves used by GPS satellite signals are respectively L1 (1575.42 MHz) and L2 (1227.60 MHz). On L1, C/A code and precision (P) code are modulated, whereas on L2, only P code is modulated. GPS satellite signals respectively provide code information and navigation information. The code information is a Gold code generated by a pseudorandom noise (PRN) code generator, which is used to differentiate the satellites and calculating a virtual distance. The code information includes a C/A code with a chip rate of 1.023*106 (code/second), and with a code length of 1023. The P code has a chip rate of 10.23*106 (code/second).

Figure 1:
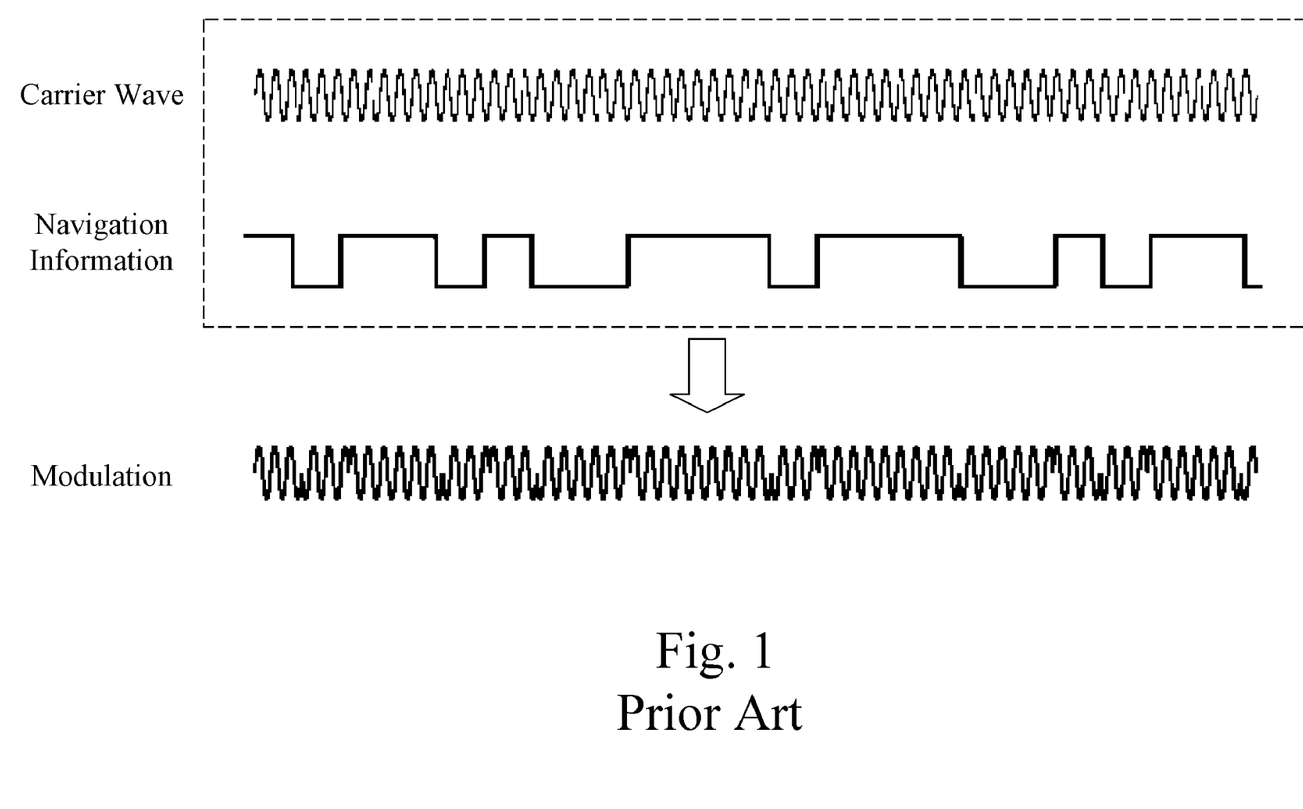
FIG. 1 is a schematic view of BPSK modulation in the prior art.

The navigation information includes: data transmission time, satellite orbit data, satellite clock data, satellite distribution, and signal quality, etc. After a binary addition is performed on the code information and the navigation information, the carrier wave is modulated through a bi-phase shift keying (BPSK) modulation manner. Referring to FIG. 1, it is a schematic view of a BPSK modulation. The satellite sends the carrier wave after being modulated by BPSK to the ground.

Figure 2:
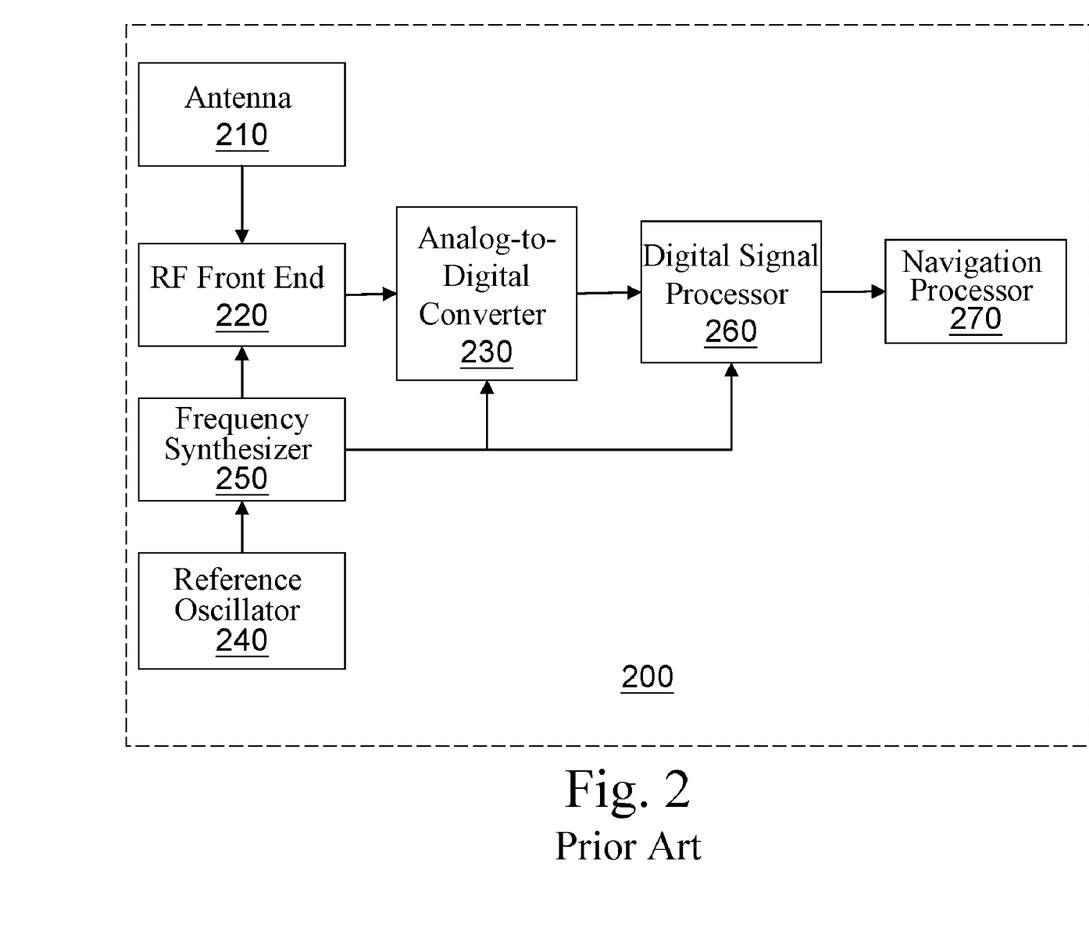
FIG. 2 is a schematic view of an architecture of a GPS receiver in the prior art.

Referring to FIG. 2, it is a schematic view of an architecture of a GPS receiver. The GPS receiver includes an antenna 210, a radio frequency (RF) front end 220, analog-to-digital converter 230, a reference oscillator 240, a frequency synthesizer 250, a digital signal processor 260, and a navigation processor 270. After the GPS receiver 200 receives satellite signals, a series of procedures are performed on the satellite signals through the RF front end 220, such as filtering, amplification, etc. Then, a wave mixing motion is performed on the signal output by the RF front end 220 with the carrier wave generated by the reference oscillator 240, and then the signal obtained after the wave mixing is input to the analog-to-digital converter 230, so as to obtain digitized satellite signals.

Figure 3:
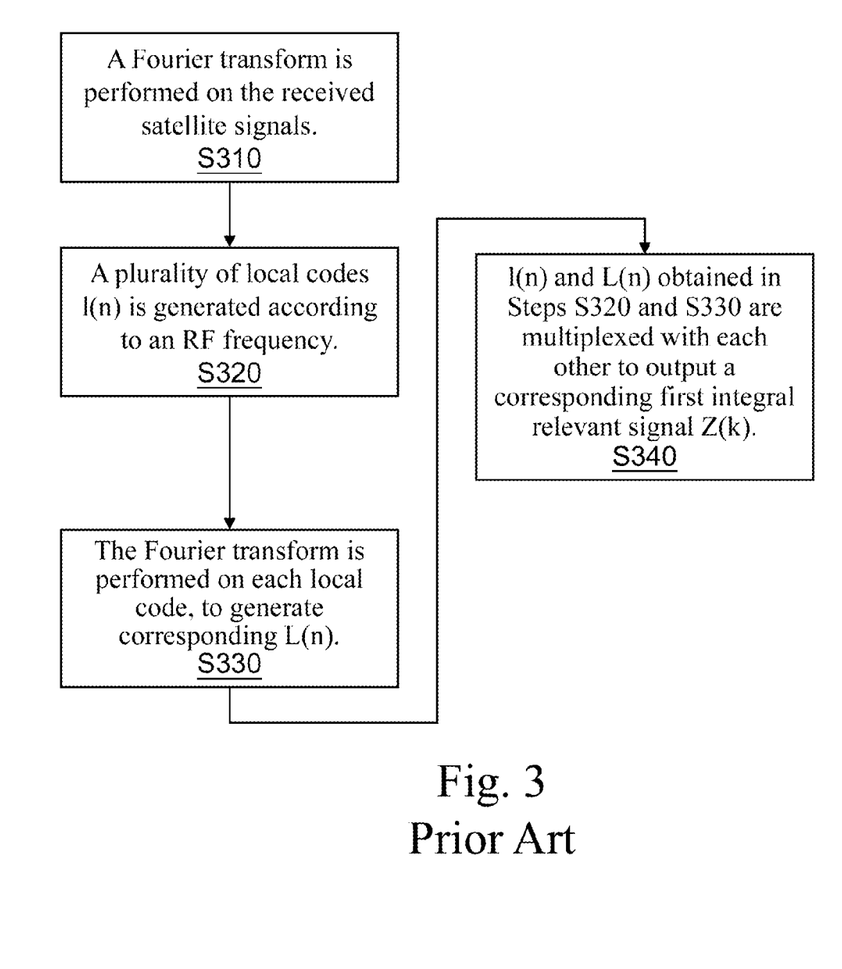
FIG. 3 is a schematic view of a satellite signal acquiring flow in the prior art.

Then, an acquiring motion is performed on the digitized satellite signals, so as to obtain Doppler shift and recognition PRN code of the GPS carrier wave signal. Referring to FIG. 3, it is a schematic view of a satellite signal acquiring flow.

First, a Fourier transform is performed on the received satellite signals (Step S310). Next, a plurality of local codes 1(n) is generated according to an RF frequency (Step S320). Then, the Fourier transform is performed on each local code, to generate corresponding L(n) (Step S330). Then, 1(n) and L(n) obtained in Steps S320 and S330 are multiplexed with each other to output a corresponding first integral relevant signal Z(k) (Step S340). As for the operation process, please refer to the following equations, and it is assumed that the obtained satellite signal is a two-dimensional data array:

$$z(n) = \sum_{m=0}^{N-1} x(m)y(n+m) \quad \text{Equation 1}$$

$$Z(k) = \sum_{n=0}^{N-1}\sum_{m=0}^{N-1} x(m)y(n+m)e^{-j2\pi nk/N} \quad \text{Equation 2}$$

$$= \sum_{m=0}^{N-1} x(m) \left[ \sum_{n=0}^{N-1} y(n+m)e^{(-j2\pi(n+m)k)/N} \right] e^{(j2\pi mk)/N} \quad \text{Equation 3}$$

$$= Y(k)\sum_{m=0}^{N-1} x(m)e e^{j2\pi mk/N} = Y(k)X^{-1}(k) \quad \text{Equation 4}$$

$$X^{-1}(k) = \sum_{m=0}^{N-1} x(m)e^{j2\pi mk/N} = \left[ \sum_{m=0}^{N-1} x(m)e^{-j2\pi mk/N} \right]^* = X^*(k) \quad \text{Equation 5}$$

in which X(k) is a conjugate function of X(k), and similarly, Y*(k) is a conjugate function of Y(k).

|Z(k)|=|Y(k)X*(k)|=|Y*(k)X(k)|

Figure 4:
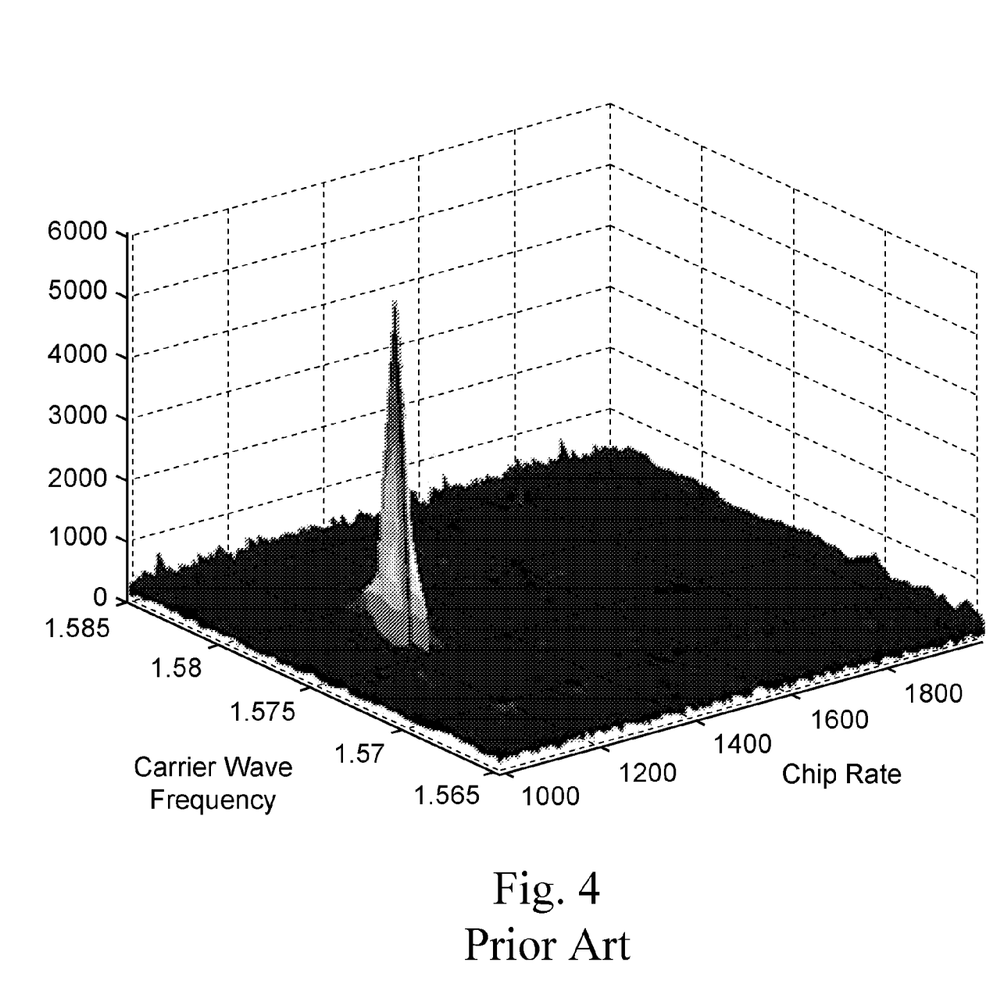
FIG. 4 is a schematic view of integral relevant values in the prior art.

Then, an inverse Fourier transform is performed on the first integral relevant value Z(k), thereby generating a second integral relevant value z(k). Finally, a maximum peak value of the second integral relevant value z(k) is obtained. If the received GPS signal includes a satellite signal with a corresponding PRN number, the peak value of the second integral relevant value is larger than the second integral relevant values of the other satellites. At this time, in the GPS receiver, the satellite signals with other PRN numbers are considered as noises. The GPS receiver can obtain the corresponding code information and carrier wave frequency according to the time point and frequency component of the peak value. If no peak value of the integral relevant value occurs during the acquiring process, the GPS receiver continuously searches for other satellites and satellite signals. Referring to FIG. 4, it is a schematic view of integral relevant values.

Since the GPS receiver performs the Fourier transform on the satellite signals, it costs time to calculate the real part and the imaginary part of the data, so only after the above operations are finished, the subsequent signal tracking and positioning processes can be executed one by one.

SUMMARY OF THE INVENTION

In view of the above problem, the present invention is mainly directed to a method of realizing GPS function on a digital camera with a low cost, for accelerating a signal acquiring speed of a GPS receiver.

In order to achieve the above objective, the present invention provides a signal acquiring method of the GPS receiver, which includes: receiving a plurality of satellite signals; performing a discrete cosine transform (DCT) demodulation procedure, to parse a receiving time base of the satellite signals; transforming the satellite signals into a code information and a navigation frequency, according to the receiving time base of the satellite signals; performing a correlation correction procedure to acquire a navigation information from the satellite signals, according to the code information and the navigation frequency.

From another aspect, the present invention is directed to a signal acquiring process of the GPS receiver implemented through a digital camera.

In order to achieve the above objective, the present invention provides a digital camera, which includes a photographing module, a DCT module, a GPS receiver, and an arithmetic unit. The photographing module is used to receive a plurality of image data. The DCT module is electrically connected to the photographing module and used to perform an image compression means on the image data received by the photographing module, thereby generating a corresponding compressed image. The GPS receiver is used to receive a plurality of satellite signals. The arithmetic unit is electrically connected to the DCT module and the GPS receiver respectively and used to perform a signal demodulation on the satellite signals, thereby parsing a receiving time base of the satellite signals and acquiring a navigation information from the satellite signals.

Through the calculation characteristics of the DCT, the present invention accelerates the processing speed on the signal acquiring flow, and combines the GPS with the digital camera by utilizing the DCT processing module in the digital camera.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Figure 5:
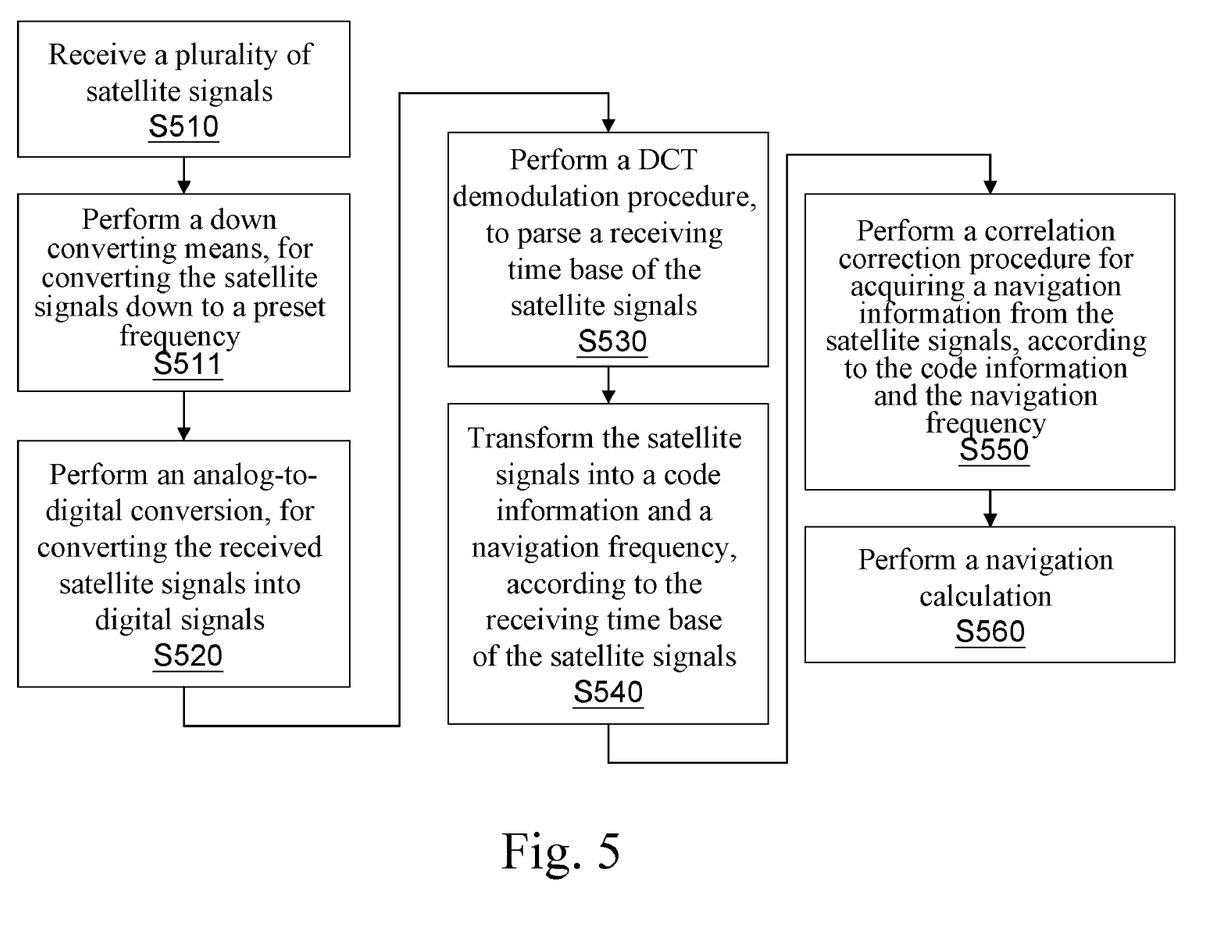
FIG. 5 is a schematic view of an operation flow of the present invention.

FIG. 5 is a schematic view of an operation flow of the present invention. In this embodiment, the method includes the following steps. Firstly, a plurality of satellite signals is received (Step S510). Next, a down converting means is performed, for converting the satellite signals down to a preset frequency (Step S511). Then, an analog-to-digital conversion is performed, for converting the received satellite signals into digital signals (Step S520).Then, a DCT demodulation procedure is performed, to parse a receiving time base of the satellite signals (Step S530). The DCT is a Lee's fast DCT, and the equations thereof are listed as follows:

$$D(i, j) = \frac{1}{\sqrt{2N}} C(i)C(j) \sum_{x=0}^{N-1} \sum_{y=0}^{N-1} f(x, y) \quad \text{Equation 6}$$

$$\cos\left[\frac{(2x+1)i\pi}{2N}\right]\cos\left[\frac{(2y+1)j\pi}{2N}\right]$$

$$f(x, y) = \frac{1}{\sqrt{2N}} \sum_{i=0}^{N-1} \sum_{j=0}^{N-1} C(i)C(j)D(i, j) \quad \text{Equation 7}$$

$$\cos\left[\frac{(2x+1)i\pi}{2N}\right]\cos\left[\frac{(2y+1)j\pi}{2N}\right]$$

$$C_{i,j} = \begin{cases} \frac{1}{\sqrt{N}} & \text{if } i = 0 \\ \sqrt{\frac{2}{N}} \cos\left[\frac{(2j+1)i\pi}{2N}\right] & \text{if } i > 0 \end{cases}$$

In the above equations, x and y are respectively coordinate values on the two-dimensional coordinate system, and f(x, y) is a two-dimensional data array. As for the Lee's Fast DCT algorithm process, please refer to the following equations, in which N values in f(i, j) are respectively grouped into odd numbers and even numbers (in this embodiment, it is assumed that N is an even number, and each value is a satellite signal), $$f(x, y) = g(x, y) + h'(x, y) \quad \text{Equation 8}$$

$$f(N-1-x, N-1-y) = g(k) - h'(k),$$

$$x = 0, 1, \ldots, \frac{N}{2} - 1, y = 0, 1, \ldots, \frac{N}{2} - 1$$

in which, $$g(k) = \sum_{n=0}^{\frac{N}{2}-1} \hat{X}(2n) C_{2N}^{(2k+1)2n}$$

$$h'(k) = \sum_{n=0}^{\frac{N}{2}-1} \hat{X}(2n+1) C_{2N}^{(2k+1)(2n+1)}$$

$$C_{2N}^{(2k+1)2n} = C_N^{(2k+1)n} = C_{2(N/2)}^{(2k+1)n}$$

Next, the above Equation 8 is rewritten into the following equations:

$$g(k) = \sum_{n=0}^{\frac{N}{2}-1} \hat{X}(2n) C_{2(N/2)}^{(2k+1)n} \quad \text{Equation 10}$$

$$2C_{2N}^{(2k+1)} C_{2N}^{(2k+1)(2n+1)} = C_{2N}^{(2k+1)2n} + C_{2N}^{(2k+1)2(n+1)} \quad \text{Equation 11}$$

$$2C_{2N}^{(2k+1)} h'(k) = \quad \text{Equation 12}$$

$$\sum_{n=0}^{\frac{N}{2}-1} \hat{X}(2n+1) C_{2N}^{(2k+1)2n} + \sum_{n=0}^{\frac{N}{2}-1} \hat{X}(2n+1) C_{2N}^{(2k+1)2(n+1)}$$

Herein, it is defined as in the following equation:

$$\hat{X}(2n-1)|_{n=0} = 0$$

and the above Equation 12 is substituted into $$\sum_{n=0}^{\frac{N}{2}-1} \hat{X}(2n+1)C_{2N}^{(2k+1)2(n+1)} = \sum_{n=0}^{\frac{N}{2}-1} \hat{X}(2n-1)C_{2N}^{(2k+1)2n} \quad \text{Equation 13}$$

$C_{2N}^{(2k+1)2(N/2)} = C_2^{(2k+1)} = 0$, so an Equation 14 can be derived: Equation 14

$$2C_{2N}^{(2k+1)}h'(k) = \sum_{n=0}^{\frac{N}{2}-1} [\hat{X}(2n+1) + X(2\hat{n}-1)]C_{2N}^{(2k+1)2n}$$

Meanwhile, it is further defined that:

$$G(n) = \hat{X}(2n) \quad \text{Equation 15}$$

$$H(n) = \hat{X}(2n+1) + \hat{X}(2n-1) \quad n = 0,1, \ldots, \frac{N}{2}-1 \quad \text{Equation 16}$$

$$g(k) = \sum_{n=0}^{\frac{N}{2}-1} G(n)C_{2(N/2)}^{(2k+1)n} \quad \text{Equation 17}$$

$$h(k) = \sum_{n=0}^{\frac{N}{2}-1} H(n)C_{2(N/2)}^{(2k+1)n} \quad \text{Equation 18}$$

$$k = 0,1, \ldots, \frac{N}{2}-1$$

The above equations are substituted, so that an Equation 19 as follows is derived:

$$x(k) = g(k) + \left[\frac{1}{2C_{2N}^{(2k+1)}}\right]h(k) \quad \text{Equation 19}$$

$$x(N-1-k) = g(k) - \left[\frac{1}{2C_{2N}^{(2k+1)}}\right]h(k)$$

$$k = 0,1, \ldots, \frac{N}{2}-1 \quad \text{Equation 20}$$

After the Equation 20 is shifted, the following equations are finally obtained:

$$g(k) = \sum_{n=0}^{\frac{N}{2}-1} \hat{X}(2n)C_{2(N/2)}^{(2k+1)n} \quad \text{Equation 21}$$

$$h'(k) = \frac{1}{2C_{2N}^{(2k+1)}} \sum_{n=0}^{\frac{N}{2}-1} [\hat{X}(2n+1) + \hat{X}(2n-1)]C_{2N}^{(2k+1)2n} \quad \text{Equation 22}$$

Figure 6:
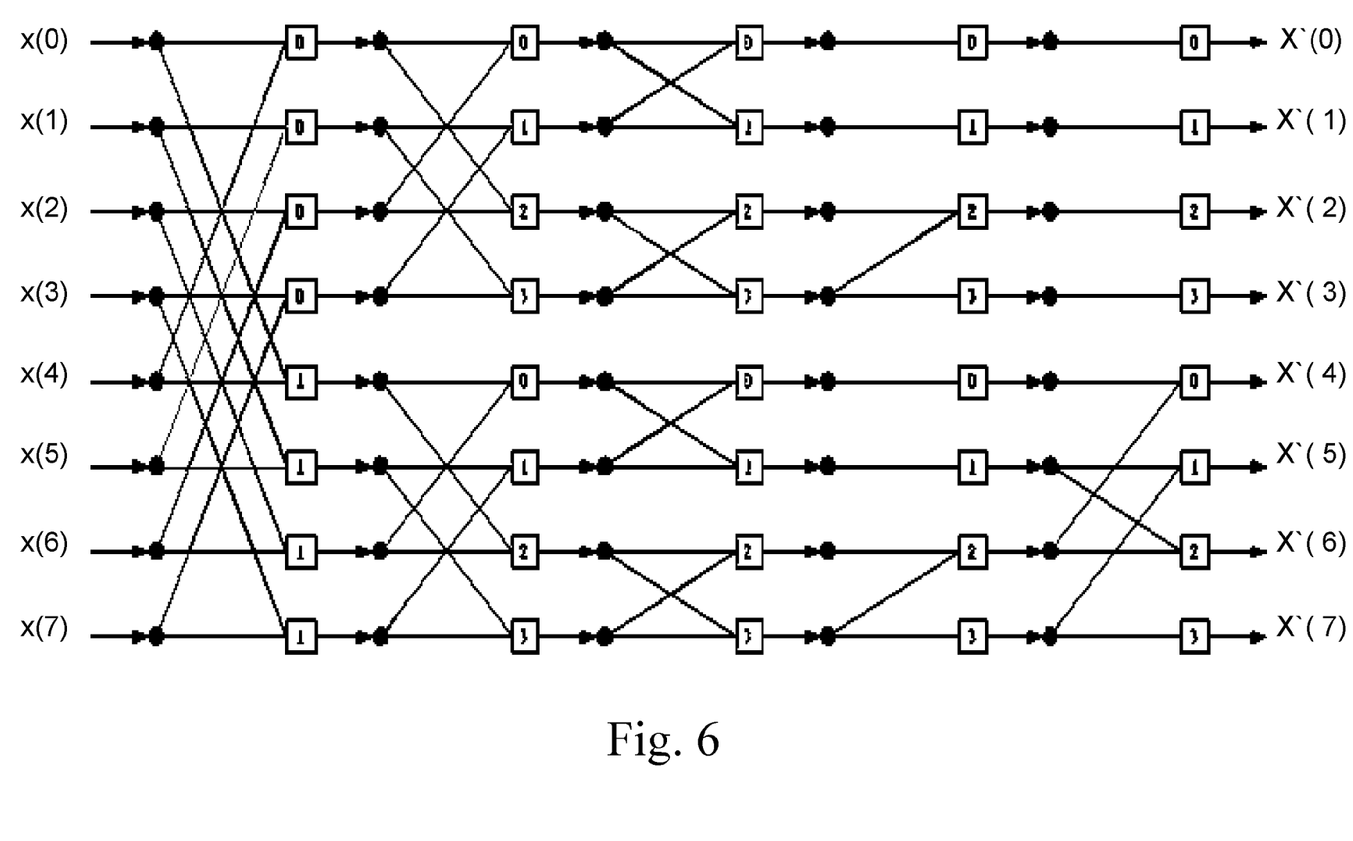
FIG. 6 is a schematic view of a data flow of the fast DCT.

The transforming manner of the Fast DCT has a plurality of repeated calculation items. Therefore, the repeated items may be re-grouped, such that a network flow chart is used for calculation. Referring to FIG. 6, it is a schematic view of a data flow of the fast DCT. On the left part of FIG. 6, they are input satellite signals x(n) from top to bottom, and here, eight data are set as an example. The right part of FIG. 6 represents output values of each satellite signal. Square frames from left to right in FIG. 6 respectively represent different calculation rounds. Each input satellite data respectively has a corresponding shortest path. The satellite data only needs to perform the corresponding calculations in each round according to the corresponding path, so as to reduce the operation complexity.

Figure 7:
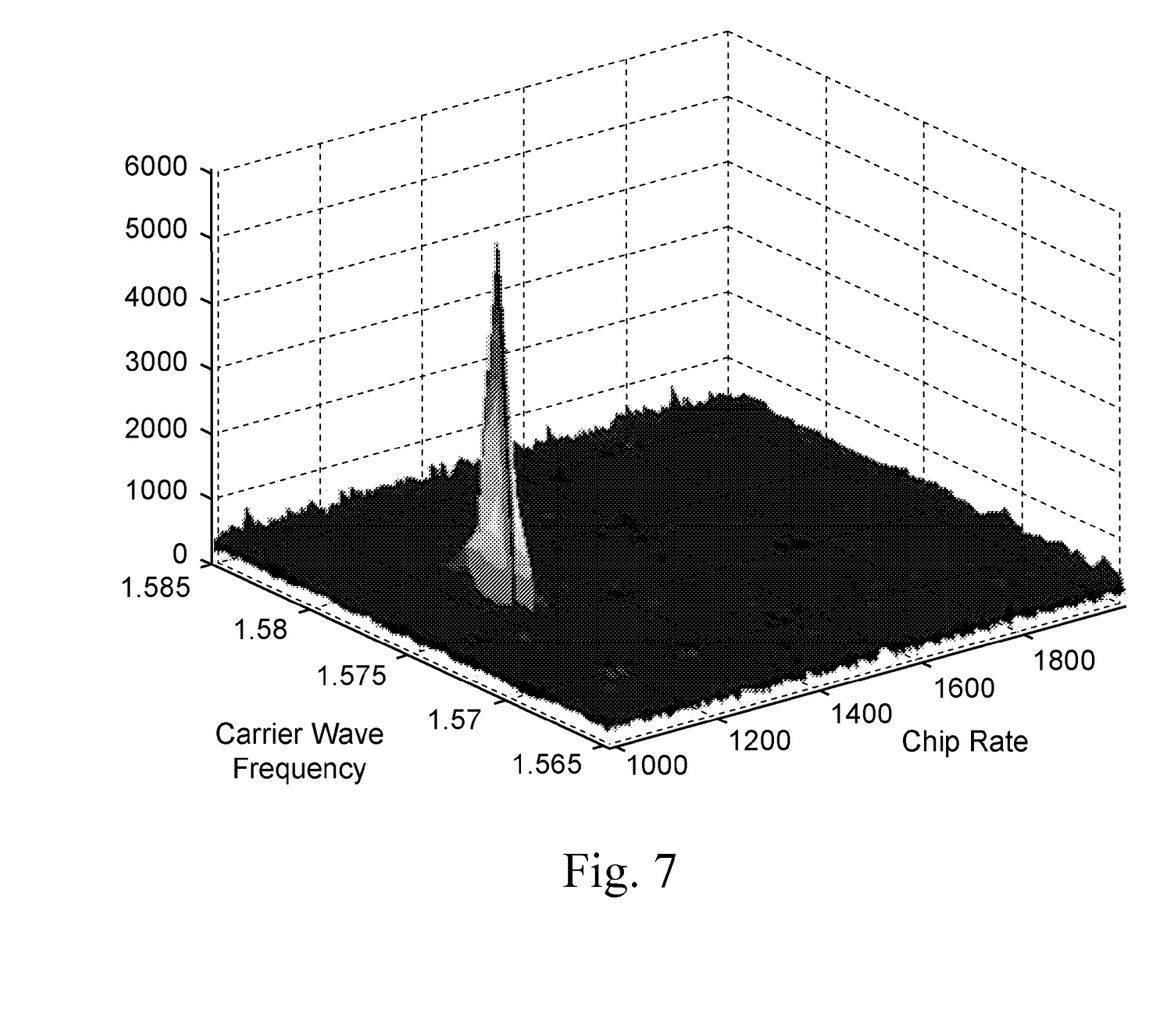
FIG. 7 is a schematic view of integral relevant values of the present invention.

This embodiment is different from the conventional art that, both the real part and the imaginary part are required to be calculated in the Fourier transform; whereas as for the DCT calculation manner, only the real part is calculated. However, during the satellite signal acquisition, the reference weight value of the real part is much larger than that of the imaginary part. Referring to FIG. 7, it is a schematic view of integral relevant values of the present invention.

The satellite signals are transformed into the code information and the navigation frequency, according to the receiving time base of the satellite signals (Step S540). Then, the correlation correction procedure is performed to acquire navigation information from the satellite signals, according to the code information and the navigation frequency (Step S550). The navigation calculation is performed (Step S560), to calculate a distance, a Doppler shift, and a relative speed between the GPS receiver and the satellite according to the satellite signals.

Figure 8:
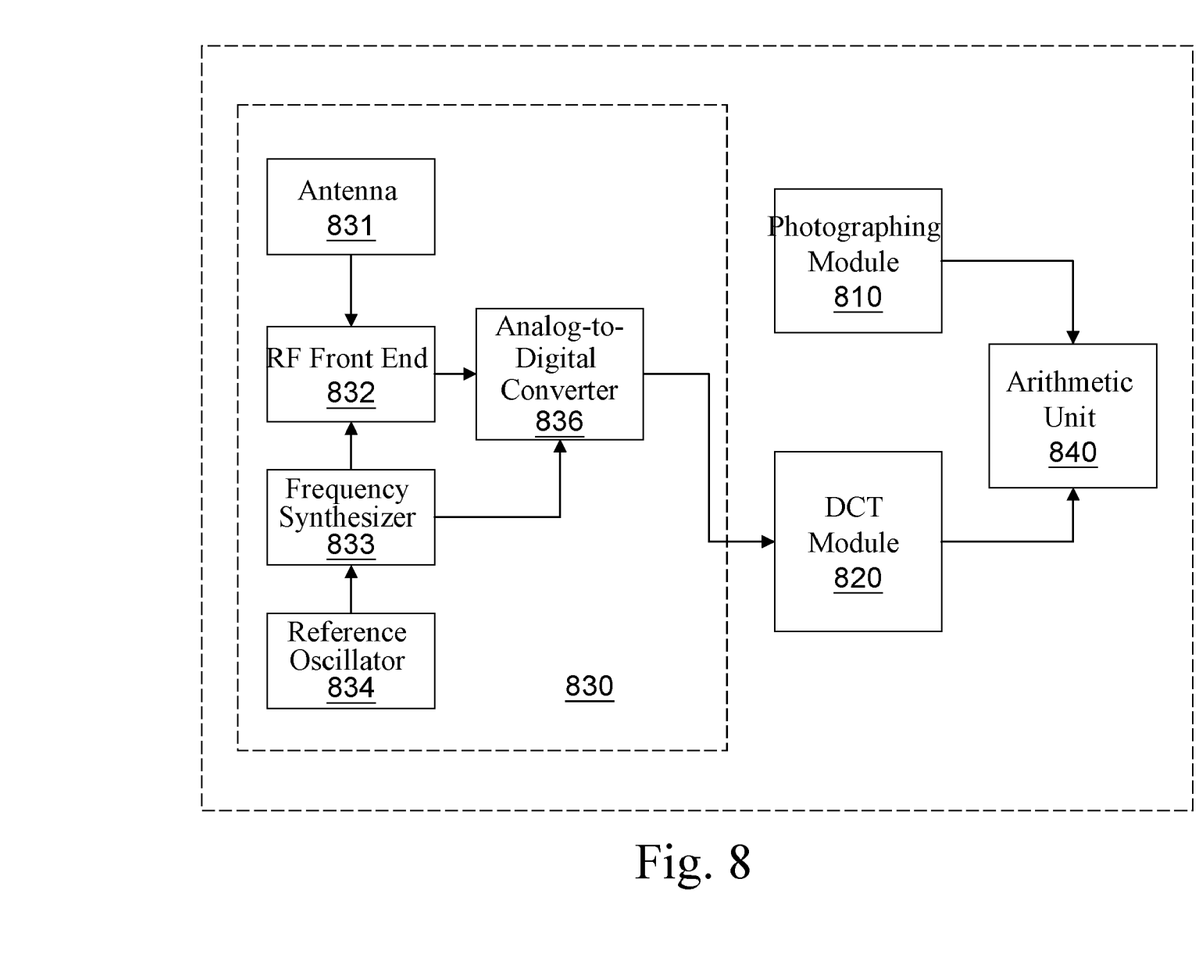
FIG. 8 is a schematic architectural view of the present invention being applied to a digital camera.

According to another implementation aspect of the present invention, it is combined with a digital camera. Referring to FIG. 8, it is a schematic architectural view of the present invention being applied to a digital camera. The digital camera further includes a photographing module 810, a DCT module 820, a GPS receiver 830, and an arithmetic unit 840.

The photographing module 810 is used to receive a plurality of image data. The DCT module 820 is electrically connected to the photographing module 810, and used to perform an image compression means on the image data received by the photographing module 810, so as to generate the corresponding compressed image. Generally, the image processing of all the digital cameras includes JPEG (JPEG File Interchange Format, briefly referred to as JPEG) compression process. The JPEG compression process includes color space transformation, sub-sampling, DCT, quantization, entropy encoding technology, and inverse DCT. The GPS receiver 830 is used to receive a plurality of satellite signals.

The GPS further includes an antenna 831, an RF front end 832, a frequency synthesizer 833, a reference oscillator 834, and an analog-to-digital converter 836. The antenna 831 is used to receive the satellite signals. The RF front end 832 is electrically connected to the antenna 831, and used to perform filtering and signal amplifying on the satellite signals. The frequency synthesizer 833 is electrically connected to the RF front end 832. The reference oscillator 834 is electrically connected to the frequency synthesizer 833, and the reference oscillator 834 is provided to the frequency synthesizer 833 to generate a carrier wave to the RF front end 832, so as to perform the wave mixing process. The analog-to-digital converter 836 is electrically connected to the RF front end 832, and used to convert the analog signal into a digital signal.

The arithmetic unit 840 is electrically connected to the DCT module 820 and the GPS receiver 830 respectively, and used to perform the signal demodulation on the satellite signals, thereby parsing the receiving time base of the satellite signals and acquiring the navigation information from the satellite signals.

Through the calculation characteristics of the DCT, the present invention accelerates the processing speed of the signal acquiring flow, and combines the GPS with the digital camera through utilizing the DCT processing module in the digital camera.

What is claimed is:

1. A digital camera provided with a signal acquiring process of a GPS, for accelerating a signal acquiring speed of the GPS receiver, comprising:
   a photographing module, for receiving a plurality of image data;

a DCT module, electrically connected to the photographing module, and used to perform an image compression on the image data received by the photographing module, thereby generating a corresponding compressed image;

a GPS receiver, for receiving a plurality of satellite signals; and an arithmetic unit, electrically connected to the DCT module and the GPS receiver, and used to perform a signal demodulation on the satellite signals, thereby parsing a receiving time base of the satellite signals and acquiring a navigation information from the satellite signals.

2. The digital camera provided with a signal acquiring process of a GPS as claimed in claim 1, wherein the GPS receiver further comprises:

an antenna, for receiving the satellite signals;

a radio frequency (RF) front end, electrically connected to the antenna, and used to perform filtering and signal amplifying on the satellite signals;

a frequency synthesizer, electrically connected to the RF front end;

a reference oscillator, electrically connected to the frequency synthesizer, and provided for the frequency synthesizer to generate a carrier wave to the RF front end, so as to perform a wave mixing process; and an analog-to-digital converter, electrically connected to the RF front end, and used to convert analog signals into digital signals.

\* \* \* \* \*